(12) United States Patent
Phillips

(10) Patent No.: US 11,814,948 B2
(45) Date of Patent: Nov. 14, 2023

(54) APPARATUS AND METHOD FOR DETECTING THE ROTATION OF A ROD-STRING IN A WELLBORE

(71) Applicant: Walter Phillips, Huntington Beach, CA (US)

(72) Inventor: Walter Phillips, Huntington Beach, CA (US)

(73) Assignee: Walter Phillips, Huntington Beach, CA (US)

( * ) Notice: Subject to any disclaimer, the term of this patent is extended or adjusted under 35 U.S.C. 154(b) by 741 days.

(21) Appl. No.: 16/228,233

(22) Filed: Dec. 20, 2018

(65) Prior Publication Data
US 2019/0203579 A1 Jul. 4, 2019

Related U.S. Application Data

(60) Provisional application No. 62/612,503, filed on Dec. 31, 2017.

(51) Int. Cl.
*E21B 47/009* (2012.01)
*G01V 3/36* (2006.01)
(Continued)

(52) U.S. Cl.
CPC .......... *E21B 47/009* (2020.05); *E21B 43/127* (2013.01); *F04B 47/026* (2013.01);
(Continued)

(58) Field of Classification Search
CPC ...... F04B 49/065; F04B 47/02; F04B 47/022; F04B 49/00; F04B 2201/121;
(Continued)

(56) References Cited

U.S. PATENT DOCUMENTS

| 1,549,175 A | 8/1925 | Adams et al. |
| 1,749,722 A | 7/1929 | Stevens |

(Continued)

FOREIGN PATENT DOCUMENTS

| CN | 102435366 B | 8/2014 |
| CN | 106767617 B | 3/2019 |

(Continued)

OTHER PUBLICATIONS

Machine translation of CN 102435366; Acceleration-based indicator diagram data acquisition device of oil pumping unit; Published Aug. 27, 2014; Retrieved from Espacenet Jun. 21, 2019 (7 pages).

(Continued)

*Primary Examiner* — Harshad R Patel
*Assistant Examiner* — Gedeon M Kidanu

(57) ABSTRACT

An apparatus for monitoring rod rotation in a rod lift system. The apparatus comprises one or more sensors that reside on the rod string of the rod lift system. The sensor is configured via a processor to generate a signal indicative of radial position of the sensor relative to an external frame of reference. The signal may be sent to a wireless I/O module, with the signals being indicative of at least partial rotation or, alternatively, a lack of rotation, of the rod-string. The processor is configured to generate an alarm if an absence of rod rotation is detected while the rod lift system is running and transmit this signal to the nearby wireless I/O module. A method for monitoring a reciprocating rod lift system is also provided.

21 Claims, 9 Drawing Sheets

(51) Int. Cl.

| | |
|---|---|
| *G01V 3/38* | (2006.01) |
| *E21B 43/12* | (2006.01) |
| *F04B 47/02* | (2006.01) |
| *G01V 3/40* | (2006.01) |
| *F04B 49/06* | (2006.01) |
| *F04B 51/00* | (2006.01) |

(52) U.S. Cl.
CPC ............ *F04B 49/065* (2013.01); *F04B 51/00* (2013.01); *G01V 3/36* (2013.01); *G01V 3/38* (2013.01); *G01V 3/40* (2013.01); *F04B 2207/70* (2013.01)

(58) Field of Classification Search
CPC ...... F04B 47/026; F04B 47/028; F04B 51/00; G01C 9/06; G01C 9/08; G01L 5/0061; G01M 7/00; E21B 43/127; E21B 47/009; H04W 4/38; G01B 7/16; H04Q 2209/40; H04Q 9/00

See application file for complete search history.

(56) References Cited

U.S. PATENT DOCUMENTS

| | | | |
|---|---|---|---|
| 2,660,124 | A | 9/1951 | Porter |
| 2,603,098 | A | 7/1952 | Cremeens |
| 3,945,774 | A | 3/1976 | Doan |
| 4,583,915 | A | 4/1986 | Montgomery |
| 4,655,300 | A | 4/1987 | Davis, Jr. et al. |
| 4,702,123 | A | 10/1987 | Hirao et al. |
| 4,815,949 | A | 3/1989 | Rabson |
| 4,924,670 | A | 5/1990 | Bausch et al. |
| 4,936,383 | A | 6/1990 | Towner et al. |
| 5,196,770 | A | 3/1993 | Champs et al. |
| 5,252,031 | A | 10/1993 | Gibbs |
| 5,252,043 | A | 10/1993 | Bolding et al. |
| 5,314,025 | A | 5/1994 | Priestly |
| 5,407,333 | A | 4/1995 | Lambright |
| 5,427,178 | A | 6/1995 | Bland |
| 5,431,229 | A | 7/1995 | Christensen |
| 5,464,058 | A | 11/1995 | McCoy et al. |
| 5,670,877 | A | 9/1997 | Scheiber |
| 5,960,875 | A | 10/1999 | Beauquin et al. |
| 6,115,792 | A | 9/2000 | Tran |
| 6,283,720 | B1 | 9/2001 | Kottke |
| 6,288,470 | B1 | 9/2001 | Breit |
| 6,289,575 | B1 | 9/2001 | Hollingsworth et al. |
| 6,315,523 | B1 * | 11/2001 | Mills ..................... F04B 49/065 417/45 |
| 6,817,409 | B2 | 11/2004 | Howard |
| 7,144,232 | B2 | 12/2006 | Locher |
| 7,445,435 | B2 | 11/2008 | Howard |
| 7,686,598 | B2 | 3/2010 | Williams |
| 7,857,043 | B2 | 12/2010 | Ali-zada et al. |
| 8,858,187 | B2 | 10/2014 | Lane |
| 9,140,113 | B2 * | 9/2015 | Hurst ..................... E21B 43/127 |
| 9,726,166 | B2 | 8/2017 | Tetzlaff et al. |
| 9,896,927 | B2 | 2/2018 | McCoy |
| 10,036,389 | B2 | 7/2018 | Li et al. |
| 10,039,143 | B2 | 7/2018 | Fyfe et al. |
| 10,125,582 | B1 | 11/2018 | Johnson |
| 10,167,707 | B2 | 1/2019 | Trapani et al. |
| 2013/0181844 | A1 * | 7/2013 | Hurst ..................... E21B 47/009 340/854.6 |
| 2017/0044849 | A1 | 2/2017 | Pitcher |
| 2017/0363079 | A1 | 12/2017 | Baker |
| 2018/0338337 | A1 | 11/2018 | Fyfe et al. |
| 2020/0263531 | A1 * | 8/2020 | Fyfe ....................... F04B 51/00 |

FOREIGN PATENT DOCUMENTS

| | | | | |
|---|---|---|---|---|
| SG | | 137763 A1 * | 12/2007 | ........... E21B 43/127 |
| WO | WO2018/203205 A1 | | 11/2018 | |
| WO | WO2019/053513 A1 | | 3/2019 | |
| WO | WO-2019053513 A1 * | | 3/2019 | .............. B62J 43/30 |

OTHER PUBLICATIONS

Machine translation of CN106767617; Acceleration-based indicator diagram data acquisition device of oil pumping unit; Published Mar. 19, 2019; Retrieved from Espacenet Jun. 21, 2019 (9 pages).
SPE 37500, J.R. Waggoner, et al.; "Development of the Downhole Dynamometer Database" published in 1997 (7 pages).
U.S. Appl. No. 62/557,627, filed Sep. 12, 2017; "Oil-Well Pump Instrumentation Device and Method" (44 pages).
U.S. Appl. No. 62/675,137, filed Sep. 12, 2018; "Solar Wireless Collector Beacon".
SPOC Rod Rotator Monitor; http: www.hawkiiii.com/oil-gas/hawkiiii-rod-rotator-monitor/poc-rod-rotator-monitor/.
Screen Shot of Weatherford Video on Intelligent Rod Rotator; https://www.youtube.com/watch?v=XDpfH5kEhxY.
Weatherford JPT Article: "Intelligent Rotator Extends Sucker Rod Life"; https://www.spe.org/en/jpt/jpt-article-detail/?art=1864.
Hart Energy Article: "Extending the Life of Rod-pumb Wells"; https://www.hartenergy.com/exclusives/extending-life-rod-pumped-wells-19282.
2016 Weatherford Brochure: "Well Pilot(R) Controllers for Rod Pump Optimization"; https://weatherford.com/en/documents/brochure/products-and-services/production-optimization/wellpilot-controllers-for-rod-pump-optimization/.
2016 Weatherford Brochure: "Sucker Rod Guides"; https://www.weatherford.com/en/documents/brochure/products-and-services/production-optimization/sucker-rod-guides/.
NOV Smart Rod Rotator: https://www.nov.com/Segments/Completion_and_Production_Solutions/Process_and_Flow_Technologies/Artificial_Lift/Production_Service_Hookup/Rod_Rotators/Smart_Rod_Rotator/Smart_Rod_Rotator.aspx.

* cited by examiner

APPARATUS AND METHOD FOR DETECTING THE ROTATION OF A ROD-STRING IN A WELLBORE

CROSS REFERENCE TO RELATED APPLICATIONS

This application claims the benefit of U.S. Ser. No. 62/612,503 filed Dec. 31, 2017. That application is entitled "Rod Rotation Detection," and is incorporated herein in its entirety by reference.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

BACKGROUND OF THE INVENTION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

FIELD OF THE INVENTION

The present disclosure relates to the field of hydrocarbon recovery operations. More specifically, the present invention relates to the production of fluids from a wellbore using artificial lift. The invention also relates to an apparatus for detecting the mechanical rotation of a rod-string during operation of a surface pumping unit.

TECHNOLOGY IN THE FIELD OF THE INVENTION

To prepare a wellbore for the production of hydrocarbon fluids, a string of production tubing is run into the casing. The production tubing serves as a conduit for carrying production fluids to the surface. A packer is optionally set at a lower end of the production tubing to seal an annular area formed between the tubing and the surrounding strings of casing.

In order to carry the hydrocarbon fluids to the surface, a pump may be placed at a lower end of the production tubing. This is known as "artificial lift." In some cases, the pump may be a progressing cavity pump, or PCP. PCP pumps use a rod-string to rotationally drive a helical rotor in a stator to move fluid into the production tubing and up to surface.

More conventionally, oil wells undergoing artificial lift use a reciprocating plunger-type of pump. The pump has one or more valves that capture fluid on a downstroke, and then lift the fluid up on the upstroke. This is known as "positive displacement." In some designs such as that disclosed in U.S. Pat. No. 7,445,435, the pump may be able to both capture fluid and lift fluid on each of the downstroke and the upstroke. (See also U.S. Pat. No. 1,549,175.)

Mechanically actuated downhole pumps are sometimes referred to as "sucker rod" pumps. The term "sucker rod" pump is a bit of a misnomer as these pumps do not actually operate on suction; rather, they build pressure to lift fluid to the surface. Reciprocal movement of the pump is induced by cycling a rod-string hung within the production tubing. The rod-string comprises a series of long, thin joints of steel bar that are threadedly connected through couplings. The rod-string is pivotally attached to a pumping unit at the surface. In response to movement of the pumping unit, the rod-string moves up and down within the production tubing to incrementally lift production fluids from a subsurface formation up to the surface.

The production of hydrocarbon fluids using a sucker rod pump creates friction and wear as the rods reciprocate up and down within the production tubing. Those of ordinary skill in the art will understand that most wells are not perfectly vertical but can have path deviations. Such deviations may be in the form of a gentle cork screw created as a largely unavoidable result of forming the wellbore using a rotating drill pipe and bit. Other such deviations may be intentional to reach reservoirs from a specific surface location. Directional wells are increasingly common and present difficulties when producing via a rod pump.

The presence of wellbore deviations can impart a side-load on the rod-string, resulting in friction and wear at deviation points. To mitigate this wear, it is desirable to rotate the rods during pumping to more evenly distribute wear along the circumference of the rods. This is accomplished by using a slow moving gear, actuated through a ratchet mechanism by the stroking motion of the pumping unit.

In modern installations, a rotator arm is provided near the top of the rod-string. The rotator arm is actuated by a cable that extends upwards to a fixed portion on the surface pumping unit, preferably the Sampson post or walking beam. As the pumping unit reciprocates, the walking beam pulls on the cable and urges the rotator arm upward. An example of such an arrangement is seen in FIG. 1 described below.

Because the rotation is very slow, it is difficult for the operator to visually observe rotation at the well head. For this reason, a failed rotation mechanism can go undetected for an extended period of time, sometimes weeks. A failed or otherwise ineffective rod rotator can result in premature failure due to uneven downhole rod or tubing wear.

Adverse downhole conditions can prevent the rotational motion of the rotator from transferring torque to the rod-string. Examples of such conditions include the presence of heavy crude, paraffin, or down-hole friction which may impede the fall of the rod-string. This condition is known as rod float and can cause the polished rod clamp to briefly lift off the rod rotator table, losing the frictional contact and associated torque imparted on the rods. Additionally, dynamic conditions such as pump impact or fluid pound can cause the rotator and polished rod to briefly separate and lose the imparted torque. These conditions are virtually impossible to identify from a brief, on-site observation as they are transient in nature.

In an attempt to detect rod rotator failure, a rod rotation monitoring system was developed by Weatherford International PLC. The monitoring system utilizes a magnetic strip or, alternatively, an RFID tag, placed on a tubular body to be rotated. Movement of the tubular body is then detected by a sensor that is distal from the magnetic strip (or the RFID tag). In the Weatherford system, signals indicative of rotation (by inferring proximity of the magnetic strip or the RFID tag) are sent to a separate controller (such as the pump-off controller) which then records complete revolutions over a given period of time. If the rod-string (or other tubular body) does not meet an expected rotation value determined by the rotational angle associated with each stroke of the pumping unit, then an alarm is sent.

The rod rotation monitoring system of Weatherford is described in U.S. Pat. No. 9,140,113, issued in 2015. The '113 patent was assigned to Weatherford Technology Holdings, LLC of Houston, Tex. A shortcoming of the Weatherford rod rotation monitoring system is that it requires a sensor separate from the tag (or magnet). Specifically, a dedicated sensor must be placed within a component of the tubing head or rod rotator to sense rotation. Furthermore, because this system incorporates two distinct components to achieve sensing, proper installation and alignment is required.

A need exists for a rod rotation monitoring system that places a single sensor on the polished rod (or rod-string) itself, without need of placing a separate stationary sensor internal to the rod rotator. A need further exists for such a system that is capable of detecting an absence of rod rotation without complete revolutions of the rod-string. Still further, a need exists for a rod rotation detection system that can sense "ineffective" rod rotations caused by the rod-string becoming temporarily bound up at some point down-hole from the rotation source, and then uncoiling.

BRIEF SUMMARY OF THE INVENTION

An apparatus for monitoring a reciprocating rod lift system is provided herein. The apparatus is designed to detect rotation of a polished rod associated with a wellbore. Preferably, the polished rod is connected to a traditional rod-string or a continuous rod-string that extends from a well head into the wellbore. The polished-rod and rod string are rotated using any known rod rotation mechanism.

The apparatus first comprises a sensor. The sensor resides on the polished rod (or any part of a reciprocating string below the polished-rod) of a pumping unit. The sensor is configured to generate a signal indicative of absolute radial position, or of heading direction, of the polished rod during rotation. Preferably, the sensor is attached to the polished rod using a clamp or a strap.

In one aspect, the sensor is also configured to determine vertical motion. This indicates whether the rod lift system is stroking or whether it has stopped. The sensor generates an alarm if the rod lift system is running but no rotation of the polished rod is detected during a given period of time.

The apparatus also includes a processor. Preferably, the processor is integrated with the sensor within a housing to form an integral sensing device. The sensing device may contain various individual sensing components. The processor is configured to receive signals from the sensing components that are indicative of at least partial radial position of the rod-string, or changing vertical position that is indicative of stroking action.

Preferably, the sensing components of the sensing device comprise a magnetometer. The magnetometer is effectively a compass that identifies a radial orientation of the sensor relative to a fixed external location such as magnetic north. Magnetometers operate by reading the strength of a magnetic field in a given direction. In the present disclosure, the magnetometer provides data indicative of absolute rotation.

The sensing components may also include a barometer, accelerometer and/or a gyroscope. These components may be used to detect vertical motion, indicative of stroking. The processor generates an alarm if the rod lift system is running (or "stroking") but no rotation of the polished rod is detected. Optionally, the processor is further configured to receive confirmation signals from a rod pump controller located at the well advising (or confirming) as to whether the rod lift system is running, though this is not the preferred arrangement.

The apparatus optionally also includes a receiver. The receiver may be referred to herein as a "wireless I/O module." The wireless I/O module is located remote from the well head and is configured to receive pre-processed signals from the sensing device (via a transmitter associated with the processor) that are indicative of rotational state of the rod-string. The wireless I/O module converts the digital alarm signal received from the processor into an electrical output that can be relayed or connected to a rod pump controller as a generic switch input indicating the presence of rotation, or as an analog signal indicating direction, total rotation count, or effectiveness of rotation.

It is noted that the area near a wellhead is a classified hazardous environment and electrical connections can pose a safety concern. By utilizing a secondary wireless I/O module located outside of this environment, the sensing device can be constructed in a self-contained, intrinsically safe manor.

In one aspect, the processor is further configured to generate the alarm if a minimum number of revolutions of the polished rod over a given period of time is not achieved. Because the sensing components are capable of measuring a range of readings, corresponding to a compass heading, the processor is able to determine a rate of rotation at any given point. If this rate effectively falls to zero, the processor can determine this lack of rotation without knowledge of the associated angle per stroke. Rod rotation fails either completely through a mechanical failure, or intermittently through loss of frictional contact. Both of these conditions can be determined by observing the zero or non-zero rate of rotation. In still another aspect, the processor is configured to only generate the alarm during periods where the unit is stroking and rotation is not present. Rotation during idle periods is not expected and therefore does not need to be considered. Indicating non-rotation during idle periods would be considered a false alarm as the functionality of the rotation system is indeterminate during that period.

In one embodiment, the sensing components of the sensing device comprise a barometer. A barometer may be used to read pressure and can determine elevation from the surrounding air pressure. In the present application, the barometer is configured to determine cyclic vertical motion of the sensing device, indicating the unit is actively stroking and rotation is to be expected. Stroking action can be indicated by the barometer, accelerometer, or magnetometer individually, or these sensor readings can be combined to more accurately indicate the operational state of the pumping unit.

In one embodiment, the sensor is placed along the rotationally constrained bridle assembly of the rod lift system. The bridle assembly is located over and is operatively connected to the polished rod. The polished rod, in turn, is mechanically connected to the rod-string.

In this arrangement, the sensor comprises one or more sensing components. The sensing components may comprise a magnetometer, accelerometer and/or a gyroscope. In this instance, the accelerometer and gyroscope are configured to determine immediate rotational deflection of the bridle assembly during the course of a single stroke by way of an inertial reference. This is different from the overall rotation of the rod string which happens at a much slower rate. Furthermore the magnetometer, being rotationally constrained on the bridle assembly, although still susceptible to torque induced deflection, can measure the absolute radial deflection imparted by the torque present in the rod string.

In this arrangement, a processor is also provided. The processor is configured to receive signals from the sensing components indicative of instantaneous torque induced rotational deflection of the bridle assembly during stroking, and process those signals to detect intra-stroke torsional deflection over time, indicating a buildup of torque in the rod-string. In this instance, the processor may operate to quantify the effectiveness of down-hole rotation of the rod-string relative to the surface rotation of the polished rod.

An alternate embodiment for an apparatus for monitoring a rod lift system is also provided. In this embodiment, the apparatus comprises:

a sensor placed on the rod lift system, wherein the sensor is configured to generate a signal indicative of radial orientation of a rod-string extending down into the well; and a processor configured to:

receive electrical signals from the sensor indicative of the rate of rotation of the rod-string; and generate an alarm if the rod lift system is operational but invalid rotation of the polished rod is detected.

A method for monitoring a reciprocating rod lift system is also provided. The method first includes placing a sensor onto a polished rod of a rod lift system. Using a transmitter associated with a processor, the sensor generates signals indicative of radial position of the sensor relative to a fixed external location or frame of reference. An example of such an external location is magnetic north.

The polished rod is connected to a rod-string that extends down into an associated wellbore. Rotation of the polished rod transmits rotational torque to the rod-string down-hole, which in turn rotates unless restricted by some external down-hole frictional force.

The method also comprises using a processor to receive signals from the sensor indicative of rotational state of the rod-string. In one aspect, the processor determines from various individual component sensors, whether the rod lift system is activated, or "stroking." Further, the sensor and processor (together, the sensing device) also determine if the sensing device is "rotating" during periods of expected rotation.

The method additionally includes generating an alarm (only) if the rod lift system is activated but no rotation of the polished rod is detected.

Generally, the processor is configured to determine a change in absolute, or relative orientation of the rod-string (or absence of such a change), and then send a signal as the alarm to a wireless I/O module. The rod-string may be a traditional sucker rod-string or it may be a continuous rod-string. Note also that the present method is applicable to both rod pumps and rotational progressing cavity pumps.

Beneficially, the processor is not required to determine rod rotation speed, but only to detect if rod rotation is actually taking place during periods of expected rotation, namely, when the rod lift system is stroking. Thus, a calculation of revolutions over a given period of time is not necessarily conducted. Furthermore, no prior knowledge of rotations per stroke, or angle per stroke, is required (although a general "zero" or "non-zero" rotation rate can be derived from the rotation itself, without knowledge of the number of strokes).

In one aspect, the method further comprises placing an accelerometer and a gyroscope on the polished rod as part of the sensing device. The accelerometer and gyroscope determine rotational deflection of the bridle assembly during the course of a single stroke. The accelerometer and the gyroscope are calibrated to provide consistent and accurate readings.

In one embodiment, the sensor is placed onto the bridle assembly of the rod lift system. The processor periodically receives signals from a magnetometer, accelerometer and/or gyroscope, and processes those signals to detect intra-stroke torsional deflection. A change in intra-stroke torsional deflection over many strokes, followed by a rapid reduction, indicates a buildup of torque in the rod-string due to frictional resistance down-hole, followed by a sharp reduction in deflection when the rotational resistance is overcome and applied torque is lost.

The primary application of this is in rod pumped wells, but concepts herein are also applicable to progressing cavity pumps with minimal adjustments for rotational speed.

BRIEF DESCRIPTION OF THE DRAWINGS

So that the manner in which the present inventions can be better understood, certain illustrations, charts and/or flow charts are appended hereto. It is to be noted, however, that the drawings illustrate only selected embodiments of the inventions and are therefore not to be considered limiting of scope, for the inventions may admit to other equally effective embodiments and applications.

DETAILED DESCRIPTION OF CERTAIN EMBODIMENTS

Definitions

For purposes of the present application, it will be understood that the term "hydrocarbon" refers to an organic compound that includes primarily, if not exclusively, the elements hydrogen and carbon. Hydrocarbons may also include other elements, such as, but not limited to, halogens, metallic elements, nitrogen, carbon dioxide, and/or sulfuric components such as hydrogen sulfide.

As used herein, the term "hydrocarbon fluids" refers to a hydrocarbon or mixtures of hydrocarbons that are gases or liquids. For example, hydrocarbon fluids may include a hydrocarbon or mixtures of hydrocarbons that are gases or liquids at formation conditions or at surface condition. Hydrocarbon fluids may include, for example, oil, natural gas, coalbed methane, shale oil, pyrolysis oil, pyrolysis gas, a pyrolysis product of coal, and other hydrocarbons that are in a gaseous or liquid state.

As used herein, the term "rod-string" includes all components that rotate together relative to a wellbore, including the polished rod and joints or sections of steel rods.

As used herein, the terms "produced fluids," "reservoir fluids" and "production fluids" refer to liquids and/or gases removed from a subsurface formation, including, for example, an organic-rich rock formation. Produced fluids may include both hydrocarbon fluids and non-hydrocarbon fluids. Production fluids may include, but are not limited to, oil, natural gas, pyrolyzed shale oil, synthesis gas, a pyrolysis product of coal, nitrogen, carbon dioxide, hydrogen sulfide and water.

As used herein, the term "fluid" refers to gases, liquids, and combinations of gases and liquids, as well as to combinations of gases and solids, combinations of liquids and solids, and combinations of gases, liquids, and solids.

As used herein, the term "wellbore fluids" means water, hydrocarbon fluids, formation fluids, or any other fluids that may be within a wellbore during a production operation.

As used herein, the term "gas" refers to a fluid that is in its vapor phase. "Gas" may be referred to as a compressible fluid.

As used herein, the term "subsurface" refers to geologic strata occurring below the earth's surface.

As used herein, the term "formation" refers to any definable subsurface region regardless of size. The formation may contain one or more hydrocarbon-containing layers, one or more non-hydrocarbon containing layers, an overburden, and/or an underburden of any geologic formation. A formation can refer to a single set of related geologic strata of a specific rock type, or to a set of geologic strata of different rock types.

As used herein, the term "wellbore" refers to a hole in the subsurface made by drilling or insertion of a conduit into the subsurface. A wellbore may have a substantially circular cross section, or other cross-sectional shape. The term "well," when referring to an opening in the formation, may be used interchangeably with the term "wellbore."

Description of Selected Specific Embodiments

Figure 1:
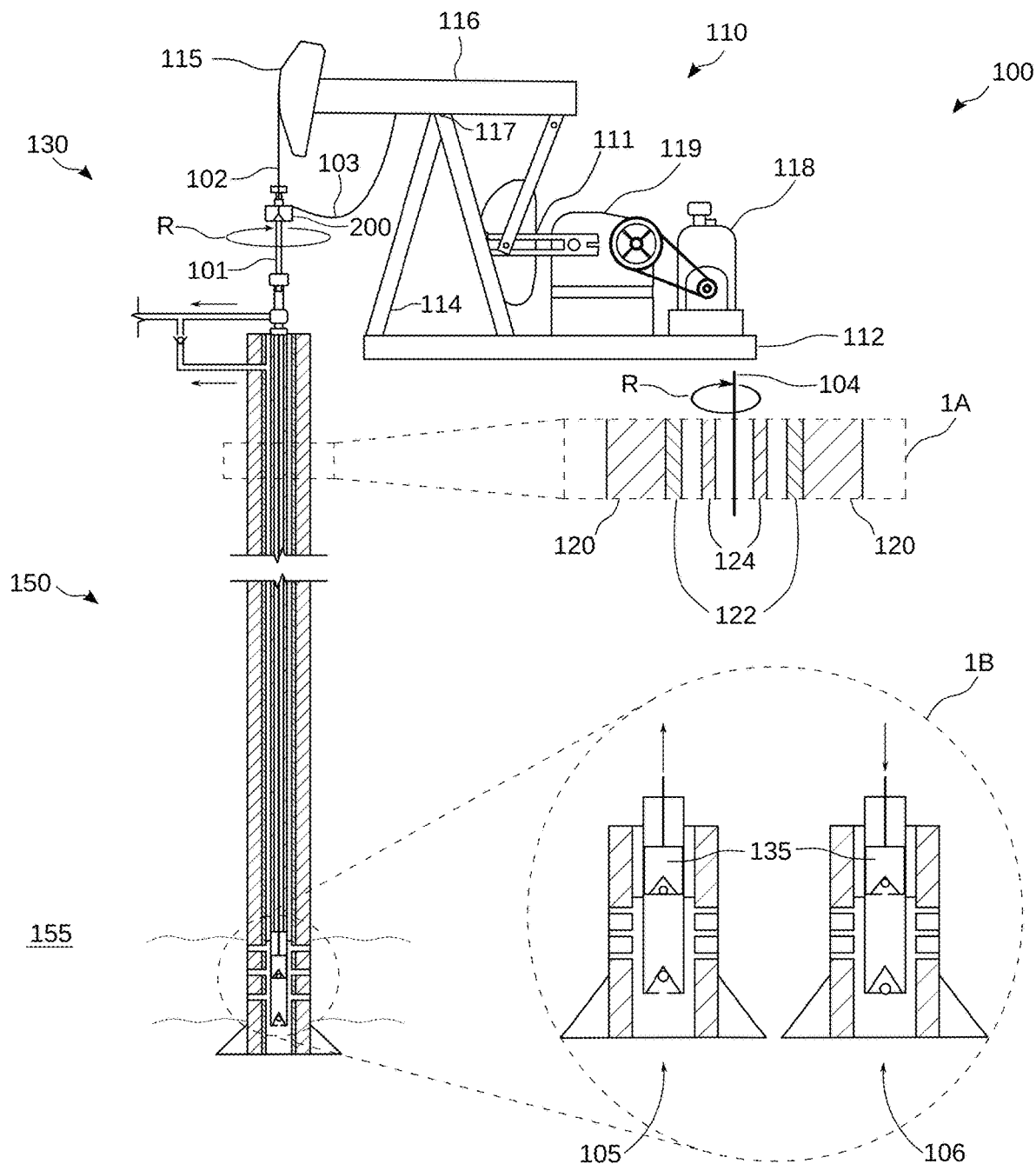
FIG. 1 is a schematic view of a known mechanical rod pumping system. The system includes a polished rod and connected rod-string. A downhole pump is connected to the lower end of the rod-string within a wellbore.

FIG. 1 provides a cross-sectional view of a rod pumping system 100. The rod pumping system 100 presents a known mechanical pumping unit 110. The pumping unit 110 includes a base 112, one or more support arms 114 extending up from the base 112, and a walking beam 116. The walking beam 116 supports a so-called horse head 115 that reciprocates up and down over a well head 130.

To create the reciprocating rocking movement of the horse head 115, a prime mover 118 is employed. The prime mover 118 may utilize an internal combustion engine to drive a shaft. Alternatively, the prime mover 118 may be an electric motor. In either instance, the prime mover causes a crank arm 111 to rotate via a gear reduction 119. The crank arms 111 utilize counterweights to provide the mechanical, counter-balancing force needed to cause the walking beam 116 to reciprocate.

It is noted that the walking beam 116 pivots over a fulcrum known as a saddle bearing 117 at an upper end of the support arms 114. The support arms 114, in turn, are colloquially known as the Sampson post.

It is understood that the mechanical rod pumping system 100 of FIG. 1 is merely illustrative. Other rod lift systems may be employed for the inventions herein including long-stroke mechanical units, pneumatic units or hydraulic pumping units. Furthermore, as noted above the system 100 can also be applied to progressing cavity pump applications, which is also considered to be a rod driven lift system.

FIG. 1 also demonstrates a wellbore 150. The wellbore 150 extends below the well head 130 down to a subsurface formation 155. As shown in the drawing, the wellbore 150 is completed vertically. However, the inventions herein may be used in connection with wellbores that have a deviated portion.

An enlarged, cross-sectional portion of the wellbore 150 is shown at 1A. Here it can be seen that the wellbore 150 includes a string of casing 122. The casing 122 is cemented into place with a surrounding column of cement 120. The casing 122 and cement 120 together isolate the wellbore 150 from the surrounding rock formations and any near-surface aquifers. It is understood that most wellbores are completed with a series of casing strings having progressively smaller outer diameters. For illustrative purposes only a single casing string is shown in FIG. 1.

The wellbore 150 also includes a string of production tubing 124. The production tubing 124 is suspended from the well head 130 using a tubing hanger (not shown). The tubing hanger resides within and is a part of the well head 130. The production tubing 124 extends into the wellbore 150 and is generally concentric within the casing string 122. Production fluids are produced from the formation 155 up to the well head 130 through the production tubing 124.

Finally, a rod-string 104 is provided within the wellbore 150. The rod-string 104 extends from the well head 130 down through the production tubing 124. An upper end of the rod-string 104 is operatively connected to a polished rod 101. The polished rod 101 reciprocates up and down into the well head 130 in response to movement of the horse head 115. Note that the polished rod 101 is connected to the horse head 115 by means of bridle cables 102 and a carrier bar (shown in FIG. 2 at 209), together referred to as the bridle assembly 240.

A pump 135 is provided proximate the bottom of the wellbore 150. An enlarged view of the pump 135 is presented at 1B. The pump 135 resides at the bottom of the rod-string 104. In view 105 the traveling valve portion of the pump 135 is moving upward within the pump barrel while in view 106 the traveling valve portion of the pump 135 is falling downward. This reciprocating movement causes production fluids to be lifted to the surface.

Figure 2:
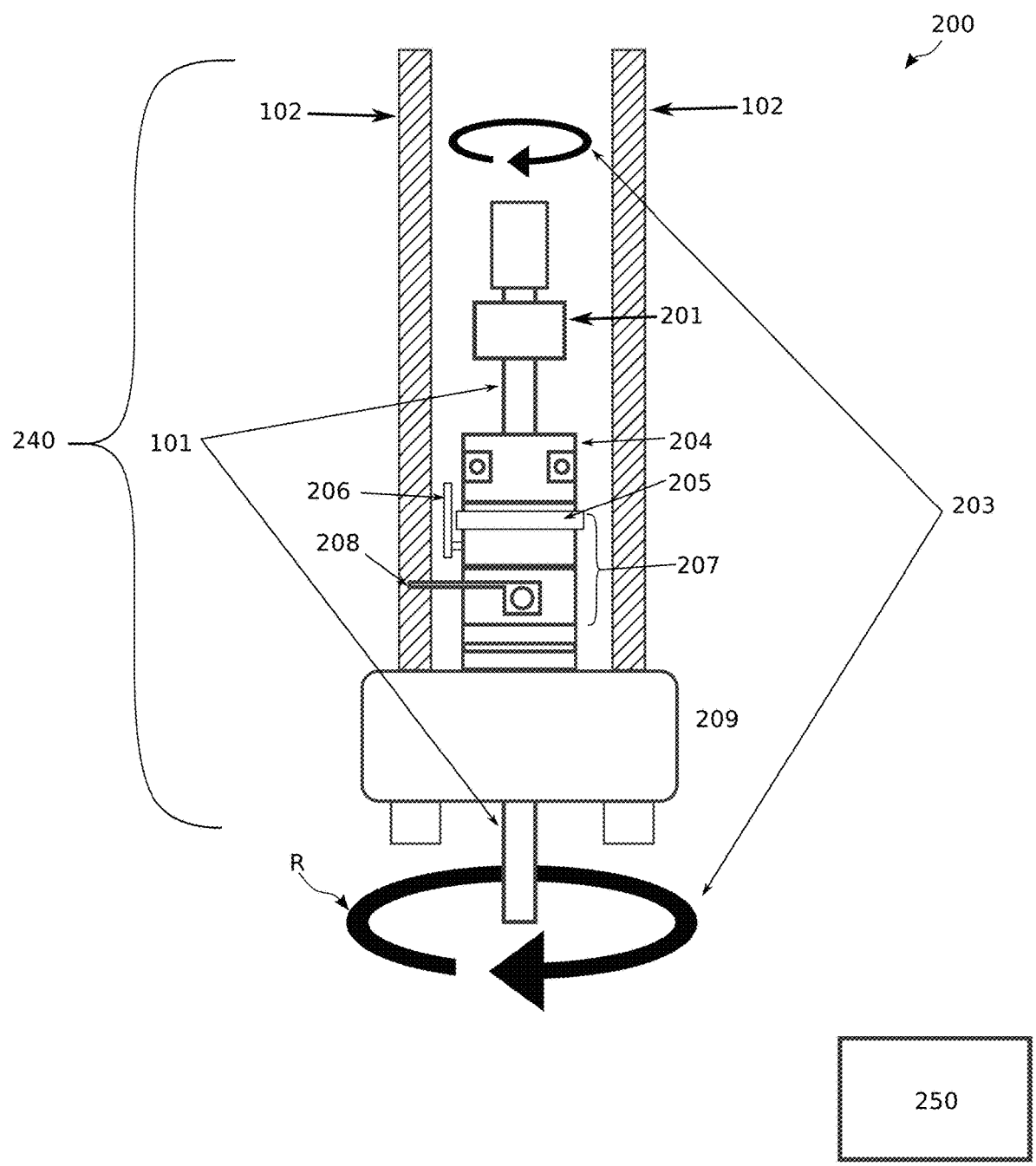
FIG. 2 is a somewhat schematic, cross-sectional view of a rod rotation system mounted onto a polished rod. A sensor is attached to the polished rod.

The well head 130 of FIG. 1 also includes a rod rotator system 200. FIG. 2 is an enlarged, cross-sectional view of the rod rotator system 200. The rod rotator system 200 is the means by which the polished rod is rotated about its longitudinal axis. In the view of FIG. 2, the polished rod is shown at 101. The polished rod 101 extends through the center of the rod rotator ratchet mechanism 207. The polished rod 101 and connected rod-string 104 are together rotated according to arrows 203, indicated by "R" in FIG. 1.

The rod rotator system 200 includes a ratchet mechanism that is frictionally engaged with the polished rod 101, via a force imparted by gravity on the polished rod clamp 204, causing the polished rod 101 and connected rod-string 104 to slowly rotate. Cable 103 is used to actuate the ratchet mechanism (shown at 207 in FIG. 2) within the rod rotator system 200. Arrow "R" illustrates the rotational motion of the polished rod 101 as imparted by the rod rotator table 205.

The rod rotator system 200 includes one or more clamps 204. The clamps 204 are installed on the polished rod 101. The polished rod clamp(s) 204 transfer the load from the polished rod 101 on to the ratchet mechanism 207 via frictional contact, and down to a rotationally constrained carrier bar 209.

The ratchet mechanism 207 is actuated by means of a lever arm 206. The ratchet mechanism 207 converts the cyclic stroking action of the horse head 115 into a unidirectional, low-speed, rotational motion through a series of gears (not shown). A frictional interface between the polished rod clamp(s) 204 and the ratcheting mechanism 207 via the rod rotator table 205 transfers torque to the polished rod 101 and then down along the length of the rod-string 104. In a typical system, rotation of the polished rod 101 is clockwise when viewed from above. This works best with the threaded connections between the joints of the rod-string 104.

Of importance, a rotational sensing device 201 is attached (or otherwise operatively connected) to the polished rod 101. In this illustration, the sensing device 201 is located above the ratcheting mechanism 207. However, the sensing device 201 may alternatively be located below the carrier bar 209, or anywhere along the rod-string 104. For purposes of the present disclosure, the uppermost joint of the rod-string 104 or any connecting pup joint is considered to be part of the "polished rod." The sensor may alternatively reside anywhere on the rotationally constrained bridle assembly 240 to provide torque buildup indication, independent from absolute rotation of the rod string.

In practice, the sensing device 201 is clamped, bolted or strapped onto (or otherwise adhered to) the polished rod 101 above the ratcheting mechanism 207. The region above the top polished rod clamp 204 is the least obtrusive, and therefore is the optimal location for the sensing device 201. In addition, size and environmental restrictions make it preferable for the sensing device 201 to be placed on the polished rod 101 at the surface and above the well head 130. The sensing device 201 could, however, be placed anywhere along the rotating assembly or on the rotationally constrained bridle assembly 240.

In the case of detecting torque build-up (or relative deflection), the sensing device 201 may reside on the carrier bar 209, on the bridle cables 102, or anywhere on the larger bridle assembly 240.

The sensing device 201 comprises a sensor. For example, the sensor may be a magnetometer that senses magnetic field. Magnetometers operate by reading the strength of a magnetic field in a given direction. The magnetometer is effectively a compass that identifies a radial orientation of the polished rod relative to a fixed external location such as magnetic north. In the present context, the magnetometer is used to detect a change in radial orientation of the polished rod. After calibration, a three-axis magnetometer can determine direction, or compass heading, of polished rod within the magnetic field.

The sensor may further comprise an accelerometer, a gyroscope or a barometer. An accelerometer can be used to detect the accelerations imparted by the directional reversals caused by stroking action. A 3-axis gyroscope is similar to a 3-axis accelerometer, except the frame of reference is a static inertial frame. A barometer can measure changing air pressure indicating the rise and fall of the sensing device. These sensors aid in identifying vertical, cyclic motion of the polished rod 101, and thus indicate that the pumping unit is stroking and rotation is accordingly expected. The magnetometer experiences a range of field distortions as the sensor moves closer and further from steel objects in the pumping system. Short term variation in the magnetometer readings can therefore also be indicative of stroking action.

The sensor (or collection of sensing components) works in conjunction with a processor. Preferably, the processor is integrated with the sensor within the same housing to form the sensing device 201. The processor receives signals from the sensor indicative of rotational location or vertical motion, and processes them.

The sensing device 201 optionally works in conjunction with a wireless I/O module 250. The wireless I/O module 250 resides at a stationary location with external power, and is located remote from the well where it may receive wireless signals from a transmitter associated with the processor. The wireless I/O module 250 serves as a receiver, and may be placed within the housing of a pump-off controller at the well site where it can be directly connected to a general purpose I/O of the pump-off controller. Alternatively, in the absence of a pump-off controller or other SCADA system, the wireless I/O module 250 can be connected to a light bulb for stand-alone rotation indication. Recall that the rotation of the rod-string 104 is very slow, and is subject to intermittent failure. The persistent visual indication by the wireless I/O module 250 aids in identifying these conditions.

Those of ordinary skill in the art will know that many artificial lift units today are controlled by a pump-off controller. The pump-off controller starts and stops the pump operation based on conditions inferred from the stroke dynamics measured through load and position, amperage, and optionally other factors. In the presence of a variable speed drive, the pump-off controller adjusts the speed of the rod lift system in response to readings from a load cell 207, typically indicative of pump fillage. Pump rate may be adjusted by increasing or decreasing power and frequency delivered to an electric motor (such as prime mover 118). The pump-off controller may also work in conjunction with a timer that determines how many hours an artificial lift system 100 will run each cycle. The idle timer is typically set by the operator manually based on production records and pump fillage. The idle timer is triggered by exceeding the operational threshold detected by the pump-off controller.

The processor (as part of the sensing device 201) defines a printed circuit board with associated firmware and circuitry. The sensing device 201 may compromise a number of sensing components such as a barometer, a magnetometer, an accelerometer and/or a gyroscope. A battery and enclosure are also provided. A transceiver and associated circuitry are provided for connectivity to the wireless I/O module 250.

The processor (as part of the sensing device 201) receives signals from the barometer, accelerometer, and/or magnetometer. These signals indicate whether the pumping unit 110 is running, or "stroking" by determining vertical cyclic motion of the sensing device 201, and thus the overall operation of the pumping system. If the pumping unit 110 is running, then the processor knows to expect and detect changes in rotational position. It is noted that the direction of rotation and the speed of rotation are not critical; the processor (as part of the sensing device 201) is capable of determining not only the presence of rotation, but the rotational direction and rotational rate without need of complete revolutions or knowledge of rotational angle per stroke.

As an aside, detecting the direction of rotation in the Weatherford system mentioned above is problematic as sensing a passing magnet or RFID tag does not provide an absolute frame of reference or direction of travel. For the detection system of Weatherford's '113 patent to work, it appears that complete revolutions of the body being sensed are required. Further, it is believed that the Weatherford sensor requires prior knowledge of the rotational angle per stroke or the number of strokes per rotation.

The preferred embodiment of the sensing device 201 is a self-contained, battery-powered device which is installed on the polished rod. This necessarily requires any external signal to be transmitted wirelessly, and then converted to a useable output or to a visual indicator. Thus, in one aspect the wireless I/O module 250 provides the output signals in a convenient location, preferably with access to external power. This allows the sensing device 201 to operate in an extremely low power mode, thus conserving battery life.

The processor (as part of the sensing device 201) communicates with the wireless I/O module 250. As with the processor, the wireless I/O module 250 defines a printed circuit board with associated hardware, firmware and/or circuitry. In one aspect, the wireless I/O module 250 includes a transceiver and microprocessor, along with a series of indicator LED's and I/O channels.

The wireless I/O module 250 may contain updatable firmware that receives signals from a transmitter associated with the sensing device 201. The signals enable and disable I/O channels which can be connected directly to a pump-off controller, or a light bulb. The wireless I/O module 250 may also provide firmware updates to the sensing device 201 via a wireless connection link 908. The wireless I/O module 250 will also accept connections via Bluetooth, Wi-Fi, or other communication channel to enable debugging, troubleshooting, and diagnostics to an operator on-site 920.

It is noted here that the wireless I/O module 250 is an optional feature. The processor (as part of sensing device 201) is capable of operating in the absence of the wireless I/O module 250. However, the nature of the sensing device 201 installation can make cabling problematic. In this respect, the sensing device 201 is both rotating and moving vertically during rod lift system operation. Furthermore, the classified hazardous environment immediately surrounding the wellhead makes it desirable to construct any electronics in a fully self-contained and intrinsically safe manor. Providing a separate wireless connectivity module 250 facilitates the construction of the sensing device 201 in a fashion compatible with the environment surrounding the wellhead, and places the outward facing electrical signal connections in a safe and convenient location away from the hazardous environment.

In practice, the power supplying the wireless I/O module 250 may be transient, and so the sensing device 201 must be capable of providing a fully processed alarm signal to the wireless I/O module 250. The wireless I/O module 250 may, however, store historical rotation states received from the sensing device 201 in non-volatile storage for long-term analysis.

Figure 3:
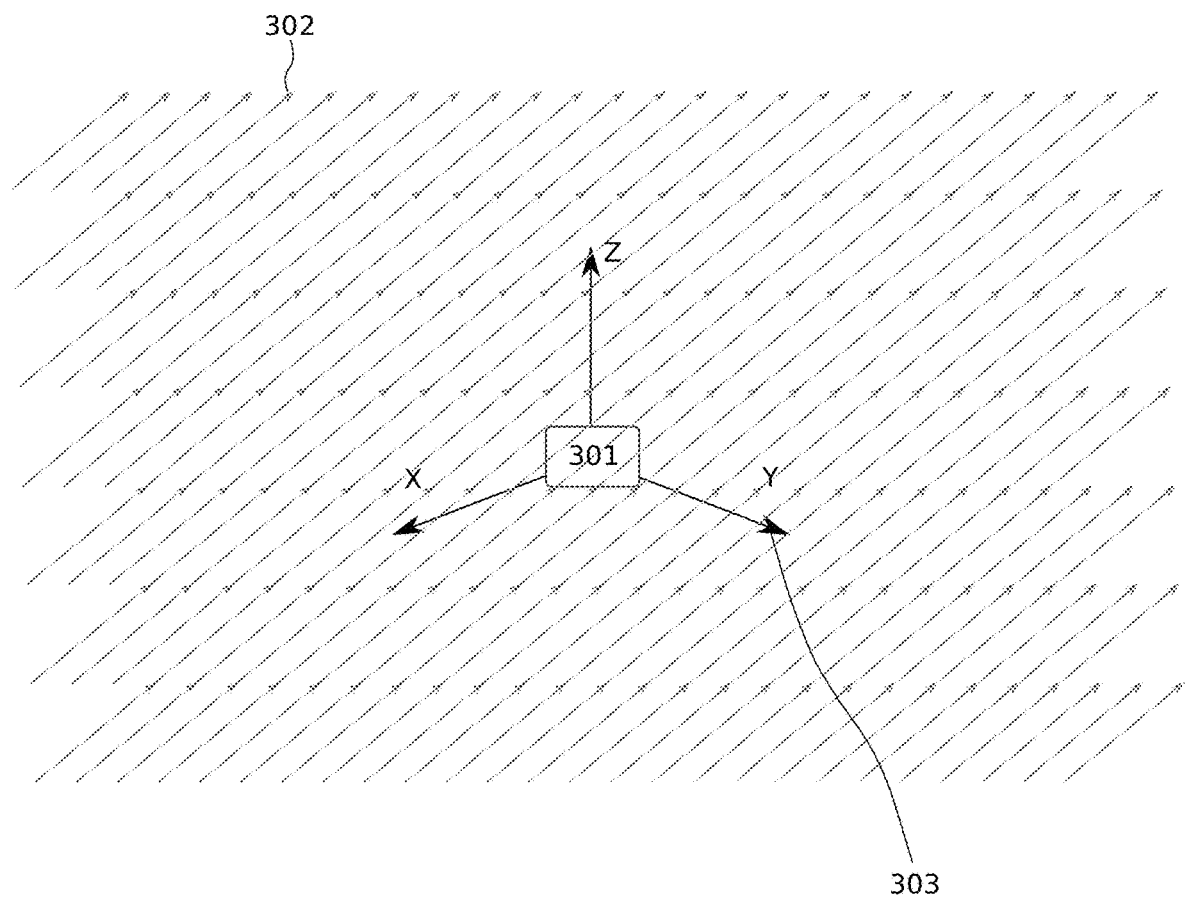
FIG. 3 is an illustration showing a multi-axis sensing device relative to an external field. The external field may be, for example, gravity or the earth's magnetic field.

FIG. 3 illustrates a generic multi-axis sensing device 301. In one aspect, the device 301 is a magnetometer and the field 302 is the earth's magnetic field. In another aspect, the device 301 is an accelerometer and the field 302 is the earth's gravitational field. In still another aspect, the device 301 is a gyroscope and the field 302 is at rest, or static. A combination of these sensors can provide an absolute orientation of the sensing device 301 and its rate of change through the various frames of reference 302.

The device 301 is designed to sense location or position relative to an external field 302. The external field 302 may be gravity, it may be the earth's magnetic field, or it may be any static inertial frame. The illustrated directional field lines 302 have both a magnitude and direction, and are shown without distortions. An additional discussion of field distortions is provided in connection with FIG. 8, below.

It is noted that a 3-axis gyroscope is similar to a 3-axis accelerometer, except the frame of reference is a static inertial frame. As a result, the indicated field lines 302 would not necessarily have a meaning at rest in the context of a gyroscope as the magnitude and direction of the gyroscope reading measures the change in inertia of the sensor.

The concept of sensor fusion may be invoked when more than one sensor is employed. Sensor fusion is the process of combining data from multiple sensors to correct for deficiencies in the individual sensors. This process can provide a more accurate position and orientation for an object being sensed. Combining sensor readings can also improve the confidence in the desired measurement, such as whether the unit is stroking or whether the rods are rotating. An example of such sensor fusion would be to observe the accelerometer and barometer to see if the peak accelerations occur at the same time as the local maximum or local minimum pressure. This would strongly indicate the system is stroking. Another example may be to observe the wireless receive signal strength indicator (RSSI) in conjunction with the magnetometer reading. If they are changing over the same time period, that adds a level of confidence that the sensor is in fact rotating. The individual sensor readings indicate rotation, but the combination can help validate that conclusion.

It is observed that the polished rod 101 provides a simplification to more complex orientation or heading calculations as the polished rod 101 is always perpendicular to the earth's surface and its motion is bound to two directions, to wit, up/down and rotationally about its vertical axis. If, however, the polished rod 101 were allowed to move in three dimensions, this method would still provide a measure of axial rotation. The mathematical calculations would be slightly more intensive, but fundamentally the same.

Figure 4:
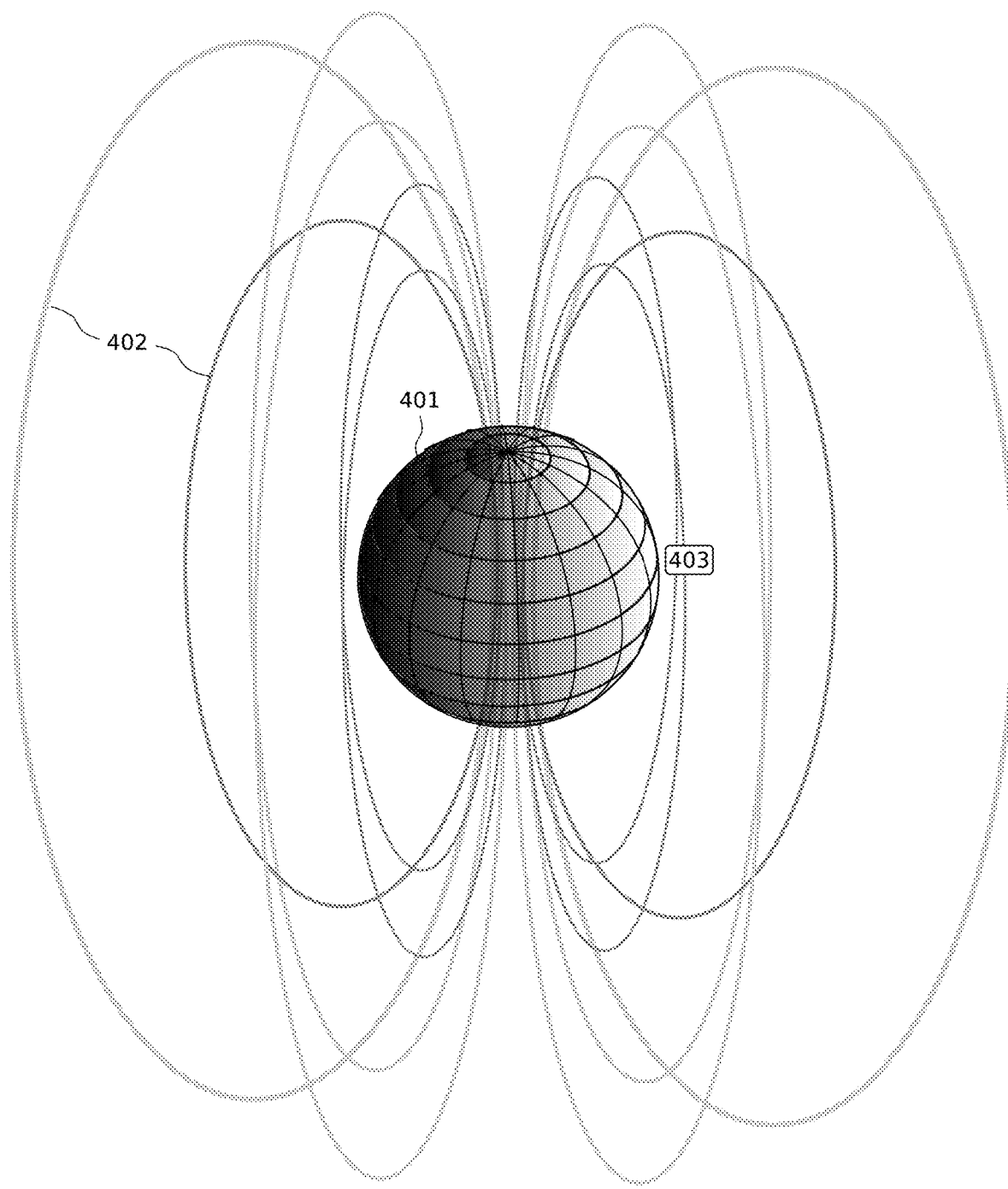
FIG. 4 is a schematic view demonstrating the earth's magnetic field.

FIG. 4 is a presentation of the earth's magnetic field. In this view, the earth's surface is shown at 401 and the sensing device is shown at 403. The earth's magnetic field is presented at 402. The earth's magnetic field 402 provides a convenient reference frame which is largely perpendicular to the orientation of a polished rod 101 in the field. This varies greatly with latitude, but should not impact the sensing as the magnetometer can provides readings in all three dimensions.

A similar scenario exists for the earth's gravity, which is generally parallel to the axis of rotation for the polished rod 101, and for a stationary inertial reference frame, which is relative to the device 403 itself.

By utilizing 3-axis sensors 403, and by combining the accelerometer and the magnetometer, the reference frame can be adjusted to compensate for the field direction at any given position on the earth's surface 401. The sensing device 403 experiences this magnetic field and its orientation within the field at any given point in time. The permanent installation on a rod pumped well 100 means that the location on the earth 401 is fixed for the duration of the operation and, thus, the overall magnetic field is static at that location.

When placed onto a polished rod, the sensor 403 is not dependent on any other components. Thus, the sensing device 201 may be installed anywhere along the polished rod or even the uppermost joint of the rod-string 104 so long as a position signal can be sent from the sensing device 201 residing along the rod string to the wireless I/O module 250.

Referring again to FIG. 2, torque is applied via the lever arm 206 to the ratchet mechanism contained in the rotator assembly 207. An anti-rotational device 208 installed on the rod rotator assembly 207 keeps the assembly stationary with respect to the carrier bar 209. The anti-rotation device 208 makes the entire bridle assembly 240 act as a single mass for the course of a given stroke. The bridle cables 102 are somewhat flexible and resist the rotation, but allow for some limited rotational deflection during the stroke. This is critical for sensing instantaneous deflection, while attached to a very slowly rotating member.

It is observed that the rod-string in a rotating application resembles a torsion bar. A torque is applied at surface and travels along the length of the sucker rods. In the absence of friction, the rods simply turn in accordance with the torque applied by the rod rotation mechanism 207 through the polished rod 101. In practice, however, friction at some distance from the surface will attempt to resist the free rotation of the rod-string 104. The steel or fiberglass rods 104 will then flex, or twist, rotationally until torque builds up enough to overcome the down-hole frictional resistance to the rotation. This build-up of torque can be released rapidly and, in some cases, can over-travel and unthread the rod connections. At the very least, this results in uneven wear distribution along the rod-string.

Figure 5:
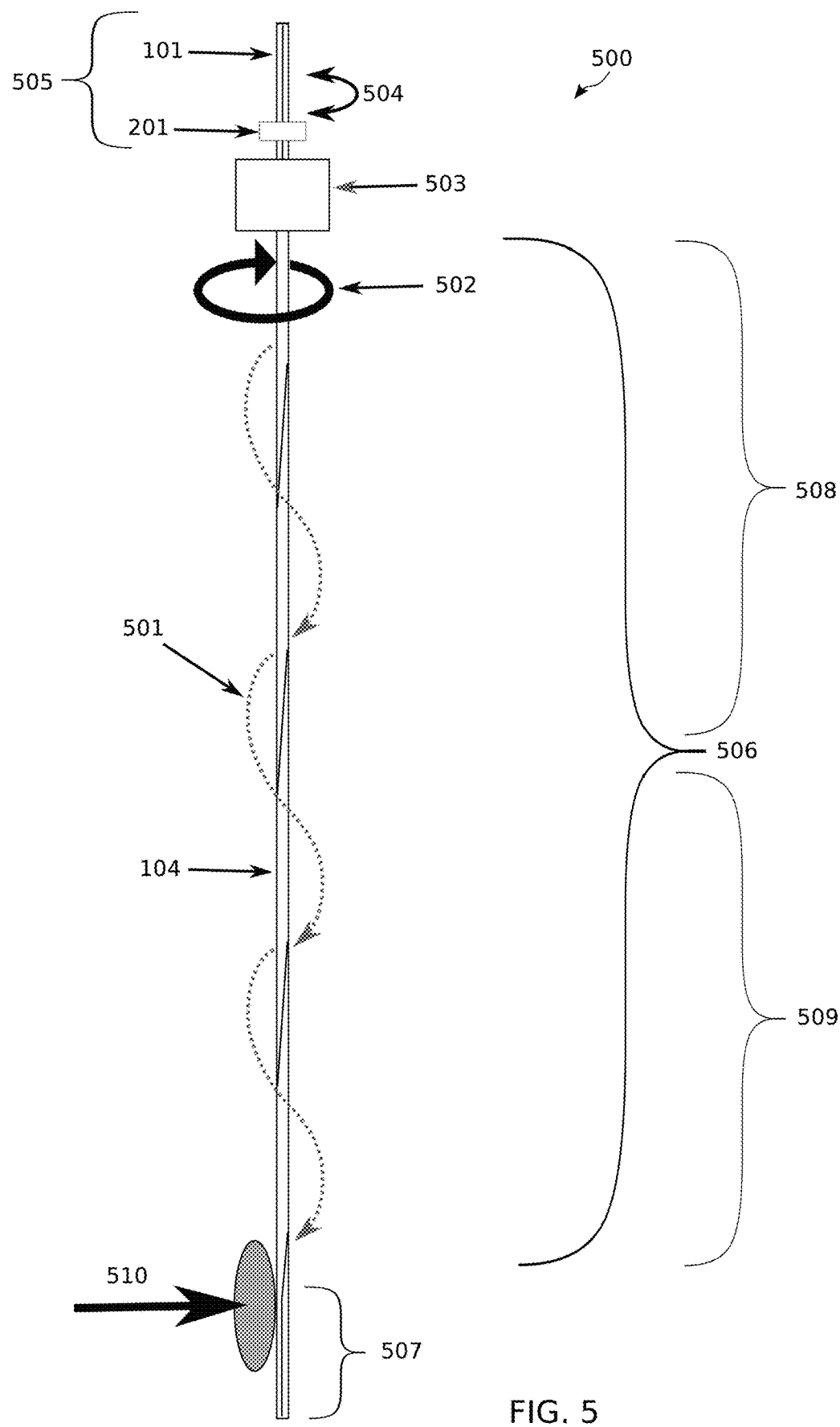
FIG. 5 is a schematic illustration of the rod rotation monitoring apparatus of the present invention, specifically illustrating a downhole frictional resistance and resulting torque buildup in the rod-string, in one embodiment.

FIG. 5 presents a schematic view of a rod-string 104 undergoing torque buildup. Torque 502 is applied using a rod rotator system 503 at the surface, with torque 502 being imparted down the length of the rod-string 104. The rod string 104 is undergoing torque as indicated by arrow 501 due to a downhole rotational restriction located at 510.

In FIG. 5 a down-hole friction resistance has been encountered along the rod-string 104. This is illustrated schematically at 510 as a side load. The resistance 510 represents a point at which the rod-string 104 is wearing against the surrounding production tubing. As a result, rod rotation is ineffectively distributing wear along the rod string. The frictional resistance 510 prevents the free rotation of the rods 104 at a distance from the source 503 of the rotational force. The rod section between the rotational source 503 and resistance 510 is illustrated by 506. The upper sections of 508 rotate, but the torque build up in the rods reduces the effective rotations in the lower sections 509.

Of interest, rod locations at 505 and 507 do not experience torque as they are above the source of rotation, and below the frictional resistance, respectively. In the absence of a rotational resistance, all sections 505-509 would all rotate evenly and smoothly.

Although the polished rod 101 is rotating at the source 503 at a constant rate, the rod sections farther down-hole experience periods of increasing torque but no rotation due to the friction resistance 506. Once enough torque is applied, illustrated by the rotational twisting stripe along the rod-string 104 and the arrows shown as 501, the static friction 510 is overcome and the rods unwind in a short period of time. Although the same overall number of total rotations may be achieved throughout the rod-string, sections of rod downhole 507 and 509 (just above and friction point 510) will have spent a greater amount of time wearing on one side. Once the rods have managed to wear one side, the rods will tend to return to this same rotational position because of the eccentric wear.

The effective rotation of the downhole section of rods 507 and 509, with respect to wear distribution, is low compared to the upper section of rods 508. In effect, the rod sections 507 below friction point 510 experience the same total number of absolute rotations as the joints 505 at surface, but the rotational restriction causes the lower section of rods to spend more time wearing on one side. This is detrimental to the longevity of the rod-string 104 and defeats the purpose of the rod rotation system. Once the wear becomes uneven, it further increases the torque 502 required to rotate and overcome the rotational friction 510, which in turn further increases the wear on that side of the rods. Early detection of this condition can prescribe treatment and mitigation actions.

It has been realized herein that effective rotation can be detected using an inertial reference frame at the surface (the polished rod 101 or upper rod-string 505). The rod lift system 100 experiences a cyclical tensile loading as the fluid load is transferred on and off of the rod-string 104. This differential, longitudinal loading affects the torque induced rotational displacement of the polished rod 101 at the surface, illustrated by arrow 504. The magnitude of the rotational acceleration, velocity, and finally displacement can be measured through the use of an accelerometer and a gyroscope over a single stroke. These measurements, in turn, can be compared over many strokes to establish a torque buildup and release period and magnitude.

It is proposed herein to utilize one or more sensing components on a rotationally limited member such as the carrier bar 209, bridle cables 102, or larger bridle assembly 240. In this approach, the absolute direction of the bridle assembly 240 can be measured over time, rather than the delta of rotation change during a given stroke utilizing inertial sensors. Either method can be accomplished using the presented apparatus.

Over time, the torque build-up and release will change the magnitude of the rotational oscillations 504 during a single stroke. As the absolute rod rotation generated by a rod rotator 205 is slow relative to the stroke rate, the polished rod 201, rotator 205, carrier bar 209 and bridle cables 102, together referred to as the bridle assembly 240, all act as a single mass for a given stroke.

As the cyclic fluid load is applied to the rod-string 104 by the down-hole pump (seen at 135 in FIG. 1), the rod-string 104 will exhibit a small rotational oscillation at the surface as the applied tensile load changes. This oscillation is illustrated by arrow 504. The oscillation occurs because the connection from the polished rod 101 to the pumping unit 110 is via flexible steel cables 102.

As the torque builds up, this oscillation 504 will change and is detectable using the inertial sensors. When the down-hole torque is released, i.e. the torque has built up enough to overcome the frictional resistance 510, the tensile load induced oscillations 504 will change significantly. This is also detectable when monitoring the oscillations 504 over time, or by observing an absolute direction change relative to the twisted member. From that trend, one can infer the severity of the down-hole friction and quantify the "effective" down-hole rotations relative to the absolute number of surface rotations.

By observing the magnitude of this intra-stroke oscillation 504 in the form of acceleration, rotational velocity, and rotational displacement derived from the accelerometer and gyroscope, one can determine the severity of the down-hole frictional resistance to the rotation. Furthermore, this frictional resistance can be correlated to other sources of wear data such as deviation surveys and historical failure reports. The location of the frictional resistance 510 can then be estimated from rod material properties and torque buildup. In short, the number of absolute rotations before a release can help quantify the torque that was applied. In a more practical sense, the trend of torque build-up and release over time can help indicate excessive or uneven down-hole wear as it develops. Furthermore, the effectiveness of prescribed mitigation actions can be monitored and quantified.

The detection of intra-stroke oscillations 504 can be done anywhere on the bridle assembly 240 illustrated in 200, not necessarily on the polished rod 101 itself. Although the polished rod 101 is rotating within the rod rotation assembly 200, it is doing so extremely slowly. The stroke-induced rotational deflection 504 occurs fairly rapidly, on the order of seconds, while the polished rod 101 rotates in terms of minutes or hours.

For convenience of installation, it is desirable to combine the instantaneous deflection sensing with the overall rotational sensing into one sensor device. This results in a significantly more complex implementation because the sensing device 201 itself is rotating. The sensing device 201 has knowledge of the absolute orientation, but not relative orientation related to the rotationally limited bridle assembly 240. The processor in the sensing device 201 must then determine a dynamic change in deflection 504, caused by the tensile load changes, using inertia rather than an absolute deflection.

If the sensing device 201 were located at a rotationally limited location on the carrier bar 209 or the bridle cables 102, then a less complex method of detecting absolute deflection may be used. For example, if the sensing device 201 is fixed to a non-rotating component, the magnetometer alone could be used to measure absolute direction (corresponding to torque induced deflection), which could be observed over time. This absolute deflection, in and of itself, is indicative "active" rotation, but only in the presence of some varying down-hole rotational resistance that would impart a torque on the bridle assembly 240.

Optionally, when placed on the polished rod, an external reference point tied to the bridle assembly 240 could be used to trigger a magnetometer reading on the sensing device at a consistent location relative to the bridle assembly. This would allow the sensor to determine the absolute orientation of the bridle assembly while the sensor itself is rotating independently of the bridle assembly on the polished rod. Through a fixed external reference, relative to the bridle assembly, the sensing device would then be able to observe changes in absolute orientation of the bridle assembly that are likely due to torque induced deflection. Examples of such reference tied to the bridle assembly could be a switch embedded in the sensor that is triggered as the sensor passes the bridle cable. The trigger could also take the form of reading the magnetic field distortions as the sensor nears an external steel component such as a bar attached to the bridle cable, the purpose of which is solely to orient the sensor relative to the bridle assembly for the purpose of measuring absolute bridle deflection while the sensing device is rotating independently. This is not necessary if the sensing device is placed directly on the bridle assembly, but then the ability to detect absolute rotation of the polished rod is lost.

An "effective" down-hole rotation is defined as a rotation that distributes wear over an extended time period and evenly over the entire circumference of the rods. Multiple instantaneous rotations would not be considered "effective" rotations since the frictional force held the rods rotationally stationary during the torque build-up. Quantifying "effective" down-hole rotations can indicate the effectiveness of the frictional wear distribution and identify trends that could result in premature well failure.

The present rod rotation monitoring apparatus can be used to determine the effective, down-hole rotations. In this respect, the cyclic loading of the down-hole plunger imparts a changing tensile load on the torqued sucker rods, which results in a small but visible rotational oscillation 504 on each pump stroke. In other words, the relative rotational displacement at surface changes over a stroke because the applied tensile load changes as the fluid load is transferred on and off the rod-string due to the down-hole pumping action.

Rotational deflection also changes due to the varying length of bridle cable 102 extended during the stroke of the surface unit. This alone is not necessarily an indication of torque induced deflection and must be accounted for. Similar to the necessity of measuring the magnetometer at a consistent position, discussed further below, the measurement of the rotational deflection change should occur at a consistent location during the stroke. Because the rotational deflection changes with applied load, the optimal location of measurement is near the top or bottom of stroke. The rotational displacement oscillates between a relative minimum and relative maximum. From this, one can dynamically quantify the applied torque and identify if, and how severe, the down-hole frictional resistance may be. Furthermore, by observing the peak applied torque before a release, one can quantify the "effective" down-hole rotation count relative to the surface rotations.

A magnetometer alone, if properly calibrated, could indicate the magnitude of torque induced deflection. This approach alone is not strictly possible when the sensor is located on the rotating member because the heading is changing with rotation. When placed on the rotating member, the sensor only has context of absolute orientation, and not specifically the relative orientation related to the bridle assembly 240. Therefore, the inertial reference frame is used to detect dynamic change in orientation during a given stroke. Absolute orientation can only be used, to detect torque deflection, relative to the bridle, not relative to the rotating polished rod.

Incidentally, a similar application can be found in progressing cavity pumps, which utilize the rotation of the rods to drive a down-hole stator element. This method and apparatus can be applied to progressing cavity pumps to determine varying rotational speed and/or torque build-up and release, known as stick-slip. Although the rotational rates are much faster in a progressing cavity pump application, the inertial rotational and torque measuring concepts are virtually identical. Typically, this rotational monitoring is accomplished by other means, such as "average" motor RPM (rather than instantaneous rate of angular velocity), and is more straightforward in a PC pump application as the drive head is stationary while the rods are turning. In the rod pump application, the rods are moving up and down in addition to rotating. The ability to detect the instantaneous angular momentum change, rather than an overall rotational speed or average torque, can uncover adverse downhole conditions in either lift method.

Figure 6:
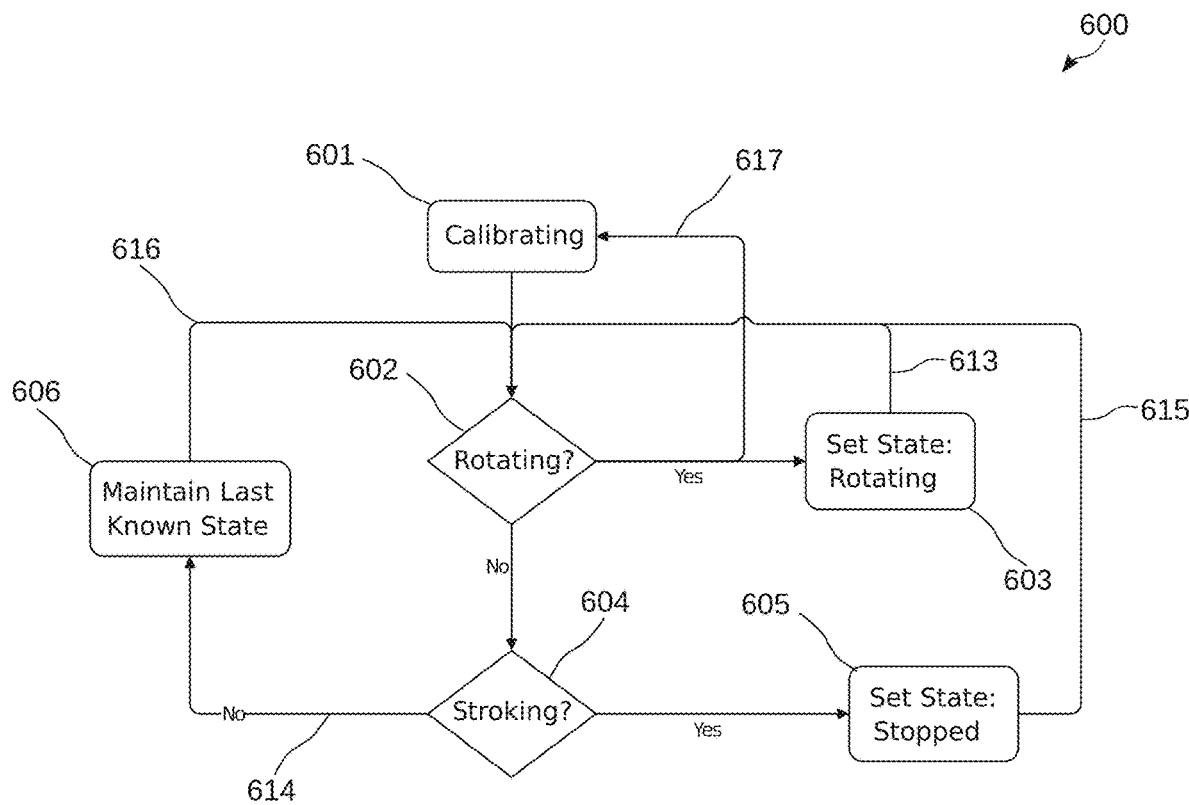
FIG. 6 is an algorithm for operating the rod rotation monitoring apparatus of the present invention, in one embodiment.

FIG. 6 shows a process 600 for detecting rotation of a rod-string 104 downhole. The detection of rotation depends on the stroking state of the surface unit 110. If the surface unit 110 is not stroking, the polished rod 101 will not be rotating. For this reason, detection of non-rotation alone is not necessarily an indication of a failure of the ratchet mechanism 207. If, however, the surface unit 110 is stroking and the polished rod 101 is not rotating, then this is a condition to be alarmed.

The process 600 starts with a calibration step. This is shown at Block 601. The purpose of the calibration step 601 is to ensure that the selected sensor is functioning properly. Where more than one sensor is used, then each sensor will need testing and set-up. This can be performed automatically in some cases, such as the magnetometer.

Calibration of the magnetometer presents a significant challenge and differs from traditional operational states and applications of magnetometers. Magnetometers are subject to distortions in the earth's magnetic field due to ferrous and/or magnetic material near the sensor. These are so-called soft and hard iron distortions. In a traditional automotive or aviation application of a magnetometer the sensor is calibrated in the vehicle with all of the distortion causing materials in place. This calibration process generally involves rotating the magnetometer through the range of directions, recording the readings, and then deriving correction factors to effectively adjust future readings. Typically the field distortions caused by the vehicle do not change, nor does the magnetometer come into close proximity to unexpected external field distortions. In typical magnetometer applications, the field distortions a sensor sees due to surrounding ferrous metal are mostly static for the period of observation. This is not the case in the reciprocating rod pump application as the sensor travels through a substantially distorted magnetic field.

Figure 8:
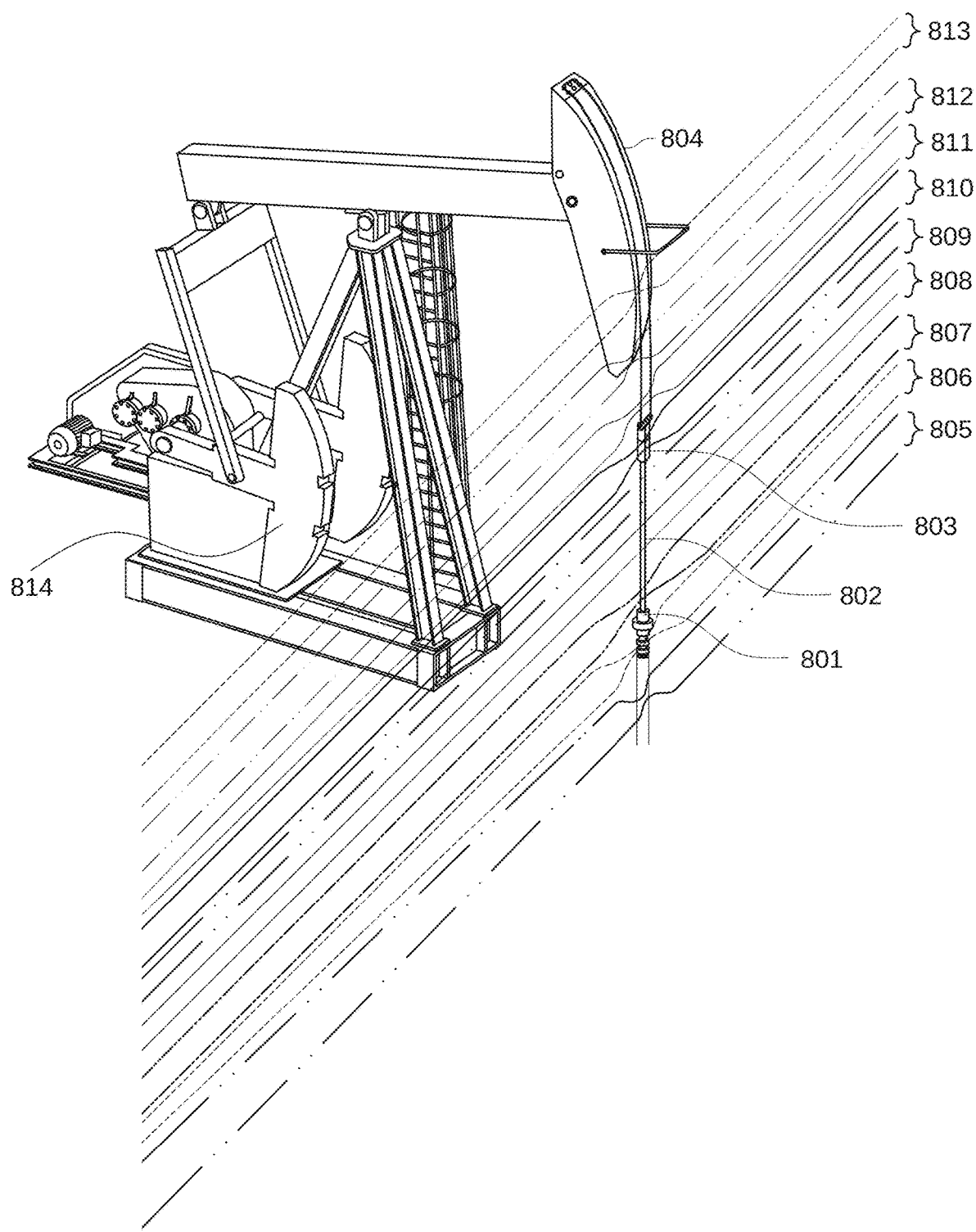
FIG. 8 is an illustration of magnetic field distortions at various elevations through the path of the sensor during pumping operations.

FIG. 8 illustrates a pumping system. A series of magnetic field lines are overlaid at various elevations (805-813) and are only shown at distances close to the vertical path of the sensor located at 803. Magnetic field lines are an abstract concept and difficult to visualize in three dimensions. FIG. 3 attempts to show this in a greatly simplified form, and the field lines 302 are shown without distortion effects.

FIG. 8 attempts to illustrate that the field lines are distorted by various components, such as the wellhead 801 and the horsehead 804. In some pumping unit configurations such as a Mark-II unit (not shown), the counterweights 814 come very close to the polished rod and can accordingly create a very dynamic field distortion which affects the sensor reading. As the pumping unit strokes, the sensor sees increasing field distortions as it nears these components. As a result, the sensor cannot simply be calibrated at any single elevation (805-813), unless every subsequent reading is taken precisely at that exact same elevation which the sensor was calibrated. A dynamic calibration must be performed to handle the rapidly changing field conditions, which can dominate the desired field readings.

The polished rod and wellhead present a much different environment than a typical magnetometer application, and bring distinct calibration challenges. First, the sensor is attached directly to a large steel bar 802 which itself significantly distorts the magnetic field, and can conduct or amplify distant field distortions. Typical magnetometer applications recommend isolating the sensor as much as possible from surrounding ferrous metals. The field distortions experienced at the polished rod alone are not adequately shown in FIG. 8. In the shown stroke position, the field lines at elevation 808 and 809 are in fact distorted near the polished rod 802. FIG. 8 is attempting to show the dynamic field variations over the course of a stroke.

It is not practical to manually calibrate the magnetometer through traditional orientation ranges as the polished rod cannot easily be manipulated. But, the nature of the system inherently provides rotation, from which the sensor can be calibrated. As the sensor only rotates through two of the three sensing dimensions, this is an incomplete calibration. Fortunately only two of the axes are required for calculating the compass heading, and so calibration through only the normal operational rotation is acceptable. The inherent rotation of the system also presents an opportunity to automatically calibrate the sensor. The challenge is to determine if the sensor is rotating initially in order to start this process. This can be done from an unknown state by observing historical readings and detecting changes in the variation of the historical magnetometer samples. In some respects, this alone may be sufficient to detect the presence of rotation. It is however incomplete and subject to false positives as the magnetic field in this application is highly dynamic and depends on the location of the sensor relative to the various steel components of the pumping system.

The second, and more significant, challenge in using a magnetometer directly on the polished rod comes from the large distortions in the magnetic field during the course of a stroke. Magnetic distortions are present throughout the stroke and the magnetometer, shown as 803 moves through these distortions, as illustrated in FIG. 8. As a result, the calibration of the magnetometer at rest is much different from that in motion. The magnitude of the distortions can dominate the reading depending on the proximity of the sensor to the ferrous material present in the pumping system. The wellhead 801, horsehead 804, counterweights 814, etc. all create distortions and act at different longitudinal positions during the motion of the sensor. Magnetic field lines are shown at various elevations (805-813) along the vertical path of the sensor 803. It can be seen that the magnetic field observed by the sensor can be substantially different in both direction and magnitude depending on the location of the sensor along its path of travel. This can yield significantly erroneous readings if not properly addressed through calibration.

Since the polished rod 101 is in motion through these various distortions, it is virtually impossible to calibrate the magnetometer using a traditional static approach. This could only be done if one knew the exact position in the stroke, and could ensure the sensor is always read in the same position, which is possible but not practical. In order to dynamically calibrate the sensor, the magnetometer can be observed at high frequency during operational conditions of one or more strokes. The minimum field reading during this operation yields the measure least likely to be distorted, and thus is repeatable. The resulting measure is similar to attempting to read a single value at the exact same position, specifically the one that is least subject to distortions. The method of reading the minimum value can however be impacted in a stopped state, if for example, the sensor stops in any position other than that of the minimum reading. The case of no vertical motion can be detected through other means, or by looking at the variation in magnetic field during the period of high frequency observations. The sensor must then eliminate these stopped readings from the calibration phase. Conveniently, a stopped unit inherently means there is no rotation, so the sensor does not need to be calibrated in a stopped state, only when it is both stroking and rotating. Furthermore, the sensing device may incorporate a number of other sensors that can help identify whether the unit is stroking.

Returning to FIG. 6, once calibrated, the sensor and associated processor determines if the sensor and attached rod-string are rotating. This is shown in the Query 602. The order of detecting rotating and stroking in Query 602 is not critical, but for power consumption purposes it is preferable to sense rotation first as that is a discrete and low frequency operation. Detecting if the unit is stroking requires observing the vertical motion of the sensor over a shorter time period, but at a much higher sample frequency.

If the processor determines that the polished rod is rotating, then the process 600 continues to operate. As shown in Box 603, the state is set to "Rotating." The process 600 then returns to the Query 602 per Line 613 for a next test for rotation.

As implied above, when the rods are rotating it is not necessary to check for stroking state. This is because the rod rotator assembly is dependent on the stroking action of the pumping unit; rotation will only be present when the unit is actually pumping. On the other hand, if the processor determines that the polished rod is not rotating, then the process 600 inquires as to whether the surface unit is stroking. This is presented in Query 604. Without this test for unit stroking state, an indication for lack of rotation alone might result in a false alarm.

If the processor determines that the surface unit is not stroking, then the process 600 moves to Box 606 according to Line 614. Box 606 provides that the processor shall remain in its last known state. If the rods are not rotating and the unit is not stroking, then the current rotating state is indeterminate and the last known state 606 should be carried forward. The process 600 then moves back to the Query 602 per Line 616. At this point, no alarm is generated as the processor is not expecting the ratcheting mechanism to be functioning when the surface unit is not stroking. This allows for retaining the fault condition notification until it has been resolved through the detection of rotation per Query 602. It is preferred to maintain the last known state of rotation to prevent false alarms.

If the processor determines that the rods are stroking, then the process 600 moves to Box 605. Here, the processor moves the set state to Stop. This is considered to be a fault condition. An alarm is generated and relayed to the operator through the wireless I/O module indicating that the ratchet mechanism is not rotating properly. The processor 600 may then return to the Query 602 per Line 615 for a next test for rotation or the processor may be temporarily turned off.

A calibration step can be periodically preformed during rotation and is indicated by 601. This calibration does not detract from the remaining states, as it is performed in parallel and can be used for future measurements. As indicated, the calibration step does not take place when the unit is not stroking as this could yield skewed, distorted measurements. Further, calibration is not undertaken when the sensor is not determined to be rotating as there is no new measurements to contribute to the calibration.

Figure 7:
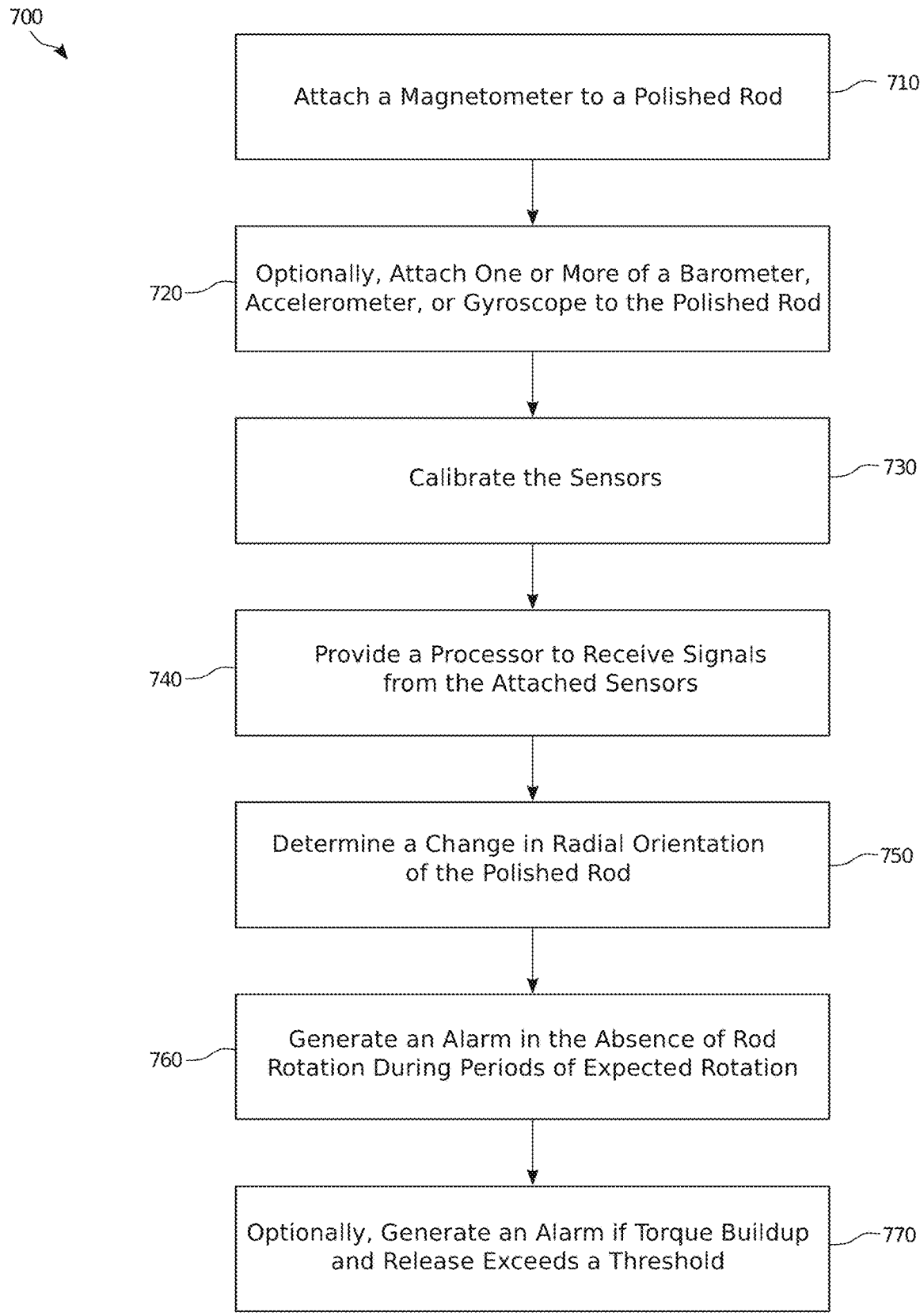
FIG. 7 is a flow chart showing steps for performing the method of the present invention, in one embodiment.

A method for monitoring a reciprocating rod lift system is also provided herein. FIG. 7 is a flow chart for the method 700.

The method 700 first includes attaching a magnetometer to a polished rod. This is shown in Box 710. The attaching may be done by using a clamp, a strap, a bolt or perhaps an adhesive. The magnetometer may alternatively reside along the bridle assembly 240.

The method 700 also includes the optional step of attaching a barometer, an accelerometer and/or a gyroscope to the polished rod. This is provided in Box 720. Attaching the barometer, the accelerometer and/or the gyroscope may include attaching these sensors to the polished rod using a clamp. In one aspect, the barometer, the accelerometer, the gyroscope and the magnetometer are all housed together in a single case.

The method 700 further includes calibrating the sensor. This is indicated at Box 730. Calibrating the sensor may include making sure each sensor is turned on and is properly working. In the case of the magnetometer, the sensor is exposed to a range of orientations and the calibration measurements are subsequently used to scale future readings. In the case of an accelerometer, the sensor must be calibrated to true vertical, which also involves exposing the sensor to a range of orientations and observing the magnitude and direction of the force imparted by gravity. Subsequent readings are then adjusted according to the calibration offset and scale.

The method 700 additionally includes providing a processor. This is seen in Box 740. The processor is configured to receive signals from the magnetometer. Where the barometer, accelerometer and gyroscope are used, the processor is further configured to receive signals from these sensors. The processor analyzes the signals, such as in accordance with the steps and features outlined above in connection with FIGS. 6 and 7.

The method 700 also includes determining a change in radial orientation of the polished rod. This is provided in Box 750. The step 750 is conducted using the processor, preferably in accordance with the process of FIG. 7.

Finally, the method 700 comprises generating an alarm. This is seen in Box 760. The alarm is generated in the event that the processor determines that rotation of the polished rod is not taking place. This alarm is generated only when rotation is expected, i.e., the surface unit is stroking. The signal is then relayed electronically to the wireless I/O module located near the well for visual or electronic indication and alarming.

Beneficially, the wireless I/O module may include a secondary, or multipurpose, transceiver that sends wireless signals to a user device on location such as a phone or tablet. Such signals may include the alarm status, rotational or torque histories, and sensor battery status. The processor preferably resides in the same housing as the sensor along the polished rod. The wireless I/O module preferably resides near the well, and may be further integrated with on-site control equipment.

Figure 9:
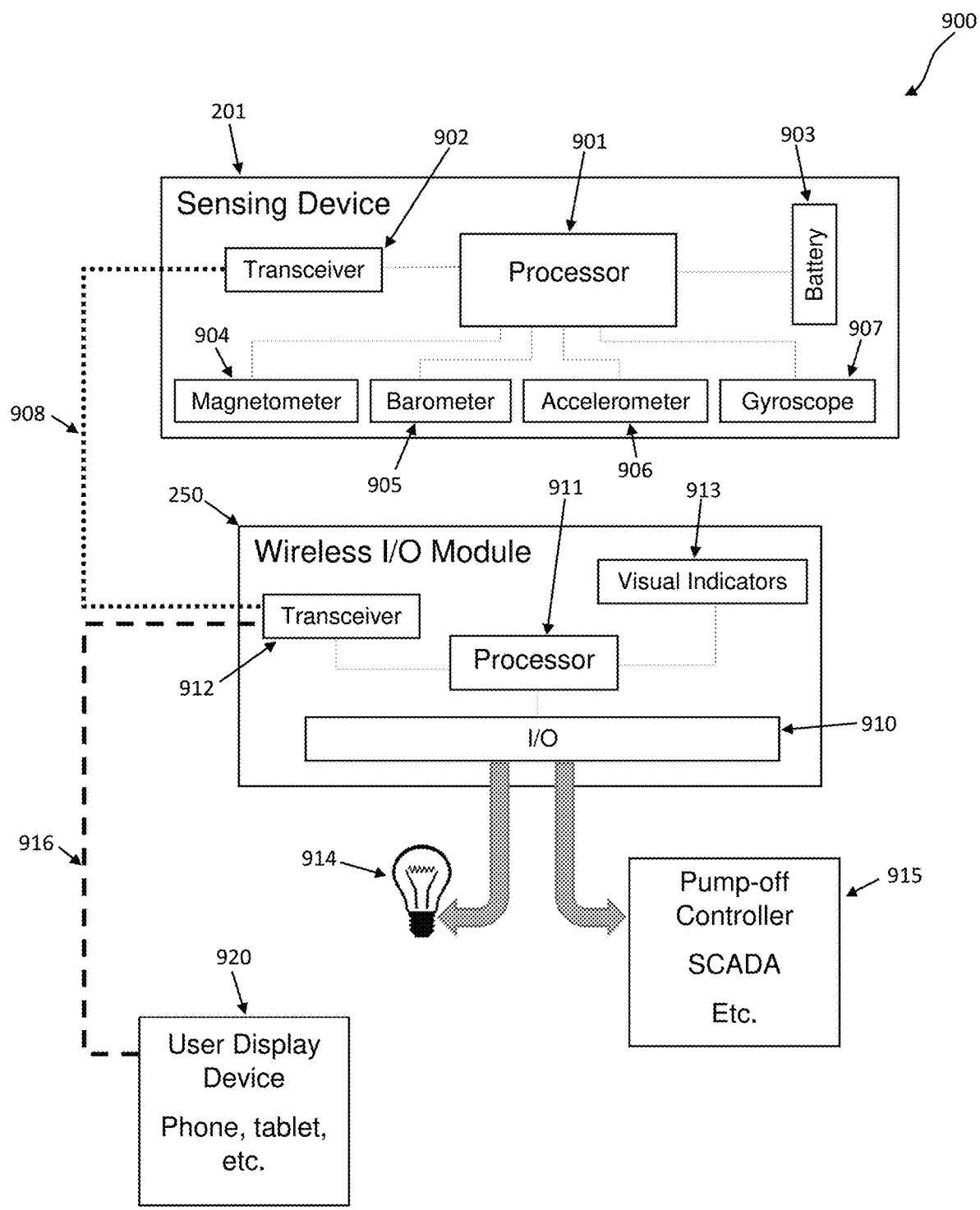
FIG. 9 illustrates the various components constituting the sensing device and the wireless I/O module, in one embodiment.

FIG. 9 illustrates the overall architecture of a rod rotation detection system 900, in one embodiment. The system 900 generally includes the sensing device 201, the wireless I/O module 250, the pump-off controller 915 and, optionally, a user display 920.

First, the sensing device 201 is constructed in accordance with the sensing device 201 described above in its various embodiments. The sensing device 201 is completely self-contained and can operate entirely in the absence of the remaining components. The sensing device 201 comprises one or more sensing components such as the magnetometer 904, the barometer 905, the accelerometer 906 and/or the gyroscope 907.

The sensing device 201 includes the associated processor 901. A battery 903 is provided, but could alternatively be powered by an external source. The sensing device further includes a transceiver 902 for wireless connectivity to the wireless I/O module 250. The data connectivity path is shown by 908, which illustrated as a wireless link between the sensing device 201 and wireless I/O module 250. Again, this connectivity could be accomplished by a hardwire connection directly to the sensor residing on the moving equipment.

The wireless I/O module 250 provides connectivity to the sensing device 201, but this could also be accomplished with a hardwire connection direct to the sensing device 201. The wireless I/O module 250 may contain a series of on-board visual indicators 913 such as LED's or other on-board display. The transceiver 912 receives messages from the sensing device, which are then handled by a processor 911. The processor 911 does not necessarily modify the content of the messages received from the sensing device 201, but is required to convert the digital messages to the appropriate I/O signals 910, which can then be connected to an external device such as a light bulb 914, or an industrial controller 915 associated with the well.

Finally, the wireless I/O module 250 may implement a multi-protocol transceiver 912, or a secondary transceiver for connectivity to a user device 920 such as a phone or tablet. This is purely for a diagnostic and troubleshooting capability and is not required for the operation of the system in general. The wireless link 916 is preferably Bluetooth or Wi-Fi. Alternatively, the sensor could provide this link directly, bypassing the wireless I/O module 250. It is preferred to keep the sensor asleep as much as possible to conserve battery life. As a result, the sensor may not be available instantaneously to accept incoming connections from a user device. The intermediary wireless I/O module 250 provides an "always available" connection option to accept connections from the sensing device or user device.

The nature of the communication link 908 between the sensing device 201 and wireless I/O module 250 provides an additional indication of rotation. The signal strength of the radio transmission, known as the Receive Signal Strength Indicator (RSSI) varies as the transmission path becomes obscured by the polished rod during a rotation. The sensing device is closely attached to the polished rod and as such, the transmit antenna is also located near the steel polished rod. The wireless I/O module is presumably located at a fixed position making the signal path between the two devices relatively stable. The variation in RSSI is then dominated by the position of the sensing device's antenna relative to the polished rod as the polished rod may partially block the transmission path 908 from the sensor to the wireless I/O module. Cyclic dips in the RSSI can indicate rotation, or can be used to double-check the rotational indicator derived from the individual sensors on the sensing device. Furthermore, correlating the RSSI to the sensing device direction can optimize the transmission scheduling such as correlating transmissions with a rotational orientation associated with the best signal. In other words, transmit at a given angle that is known to have good signal quality.

As can be seen, an improved apparatus and method for detecting rotation of a polished rod is provided. The apparatus detects the absolute device orientation relative to the earth and, thus, does not require a secondary element to detect rotation. As the device orientation changes, the compass heading, gravity, or inertial vectors will indicate both the direction and magnitude of the rotational motion over time.

The sensor of the present apparatus need only be attached to the rotating element; no separate external sensing component is required. This is because the device senses its own orientation within a pervasive gravity force, magnetic field, or inertial reference frame, and not the proximity to another element.

As designed, the apparatus is immune to problems associated with rod float. During operation, the rod rotating mechanism is not positively attached to the polished rod; rather, the ratcheting mechanism relies on a frictional interface with the polished rod and gravity to transfer the rotational motion to the rod-string. As a result, rotation of the ratcheting mechanism does not necessarily indicate that the rod-string itself is also rotating. A condition known as rod float occurs when the rods fall slower than the down-stroke of the surface unit. Under this condition, the frictional contact is lost and torque is not transferred from the ratcheting mechanism to the rod-string.

Other dynamic and less visible conditions can also cause the rotator system and rod-string to become briefly separated and torque lost. By attaching the sensor directly to the polished rod, rotational motion is positively identified. Furthermore, since the sensor does not require any external device alignment, it will continue to function even as the rod-string floats vertically relative to the rod rotator system itself. Detecting proximity to an external device, as with the '113 patent, could provide a false positive in this condition.

By sensing rod position relative to the earth's magnetic and/or gravitational field, absolute orientation of the polished rod can be determined at any given point through the rotation. Partial or incomplete rotations can be detected, and the trend in the orientation change over time can uncover transient issues. Total number of rotations and the rate at which the device is rotating can easily be determined and subsequently indicated through visual or electronic means should the operator so desire. However, this is not necessary to detect whether the ratcheting mechanism is operating properly. Also, the sensor requires no knowledge of the rotation angle per stroke, or likewise strokes per rotation. In fact, the sensor can provide these measured values.

Power consumption of the sensing device is reduced because it does not need to be on all the time. Sensing the orientation within a gravity or magnetic field can be done independently from any previous state. This means the device can be powered down between readings. The readings can be scheduled at regular intervals irrespective of any external positioning. This can be optimized to historical rotational rates, deducting idle periods to help conserve battery life.

Further, variations of the rod rotation detection apparatus and method may fall within the spirit of the claims, below. It will be appreciated that the inventions are susceptible to other modifications, variations and changes without departing from the spirit thereof.

I claim:

1. An apparatus for monitoring a rod lift system at a well, comprising:
   a sensor placed on the rod lift system, wherein the sensor is configured to generate a signal indicative of instantaneous radial orientation of a rod-string extending down into the well from a polished rod; and
   a processor configured to:
   receive electrical signals from the sensor indicative of an instantaneous status of rotation or rotational direction of the rod-string; and
   generate an alarm if the rod lift system is operational but invalid rotation of the rod-string is detected; and
   no prior knowledge of an expected rate of rotation, or a rotational angle associated with each stroke of the rod lift system, is required.

2. The apparatus of claim 1, wherein the sensor and the processor are located together in a housing, serving as an integrated sensing device.

3. The apparatus of claim 1, further comprising:
   an I/O module located remote from a wellhead associated with the well, wherein the I/O module is in electrical communication with the processor.

4. The apparatus of claim 3, wherein the processor is in electrical communication with the I/O module by means of (i) a wired connection, or (ii) a wireless communication link.

5. The apparatus of claim 4, wherein:
   the I/O module is located proximate a pump-off controller associated with the well; and the processor is configured to determine an absence of change in orientation of the polished rod over a period of time, and send a signal as the alarm to the pump-off controller located proximate the well.

6. The apparatus of claim 3, wherein:
the processor is in electrical communication with the I/O module by means of a wireless communication link; and
is configured to monitor a signal strength of the communication link, and identify rotation of the polished rod by virtue of signal strength being obscured as the sensor rotates around a distal side of the polished rod.

7. The apparatus of claim 1, wherein the radial position of the rod-string is either absolute radial position or radial displacement relative to a rotational assembly imparting torque onto the rod-string.

8. The apparatus of claim 7, wherein:
the sensor is positioned (i) on a rod-string of the rod lift system, or (ii) or a bridle assembly of the rod lift system; and
the sensor comprises a magnetometer.

9. The apparatus of claim 8, wherein the processor is further configured to:
generate the alarm if absolute rotational travel of the polished rod over a given period of time is different than an expected value, or the rotational action imparted onto the rods is ineffectively distributed along the entire length of rods.

10. The apparatus of claim 9, wherein the expected value is based on a historic rotation rate during periods of active rotation.

11. The apparatus of claim 8, wherein the processor is further configured to:
generate the alarm if a revolution of the polished rod is not achieved in a given period of time, where the time period is active only while the rod lift system is stroking.

12. The apparatus of claim 8, wherein the sensor further comprises an accelerometer, a barometer, a gyroscope, or combinations thereof.

13. The apparatus of claim 12, wherein:
the processor is further configured to receive signals advising as to whether the rod lift system is stroking.

14. The apparatus of claim 13, wherein the barometer, the accelerometer, or the magnetometer sends signals to the processor indicative of linear position of the polished rod and inferred periods where rotation is expected.

15. The apparatus of claim 12, wherein:
the sensing device resides on the bridle assembly; and
the bridle assembly is located over and operatively connected to a polished rod;
the polished rod is mechanically connected to a rod string; and
the processor is configured to receive signals from the sensor indicative of instantaneous rotational deflection of the bridal assembly during stroking, and process those signals to detect intra-stroke torsional deflection over time, indicating a buildup of torque in the rod-string.

16. The apparatus of claim 15, wherein the processor is further configured to:
generate the alarm if torque induced deflection is detected.

17. The apparatus of claim 1, wherein the processor is further configured to:
determine torque buildup and release; and
generate the alarm if torque buildup and release is detected.

18. An apparatus for monitoring a rod lift system at a well, comprising:
a sensor placed on a rod-string of the rod lift system, wherein the sensor generates a signal indicative of instantaneous radial position of the rod-string; and
a processor configured to:
receive signals from the sensor indicative of at least partial rotation of the rod-string; and
generate an alarm if the rod lift system is pumping but no rotation of an attached polished rod is detected;
wherein the sensor and the processor are located together in a housing, serving as an integrated sensing device; and
no prior knowledge of an expected rate of rotation, or a rotational angle associated with each stroke of the rod lift system, is required.

19. The apparatus of claim 18, wherein the radial position of the rod-string is either absolute radial position or relative radial displacement.

20. The apparatus of claim 19, wherein the rod lift system is a rotating rod lift system that employs a progressing cavity pump below the rod string downhole.

21. The apparatus of claim 19, wherein the rod lift system is a reciprocating rod lift system that employs a positive displacement pump below the rod string downhole.

* * * * *